July 4, 1967     C. G. DAVIS ETAL     3,328,874
METHOD AND APPARATUS FOR MANUFACTURING COMPOSITE CONDUCTORS
Filed Oct. 19, 1962     2 Sheets-Sheet 1
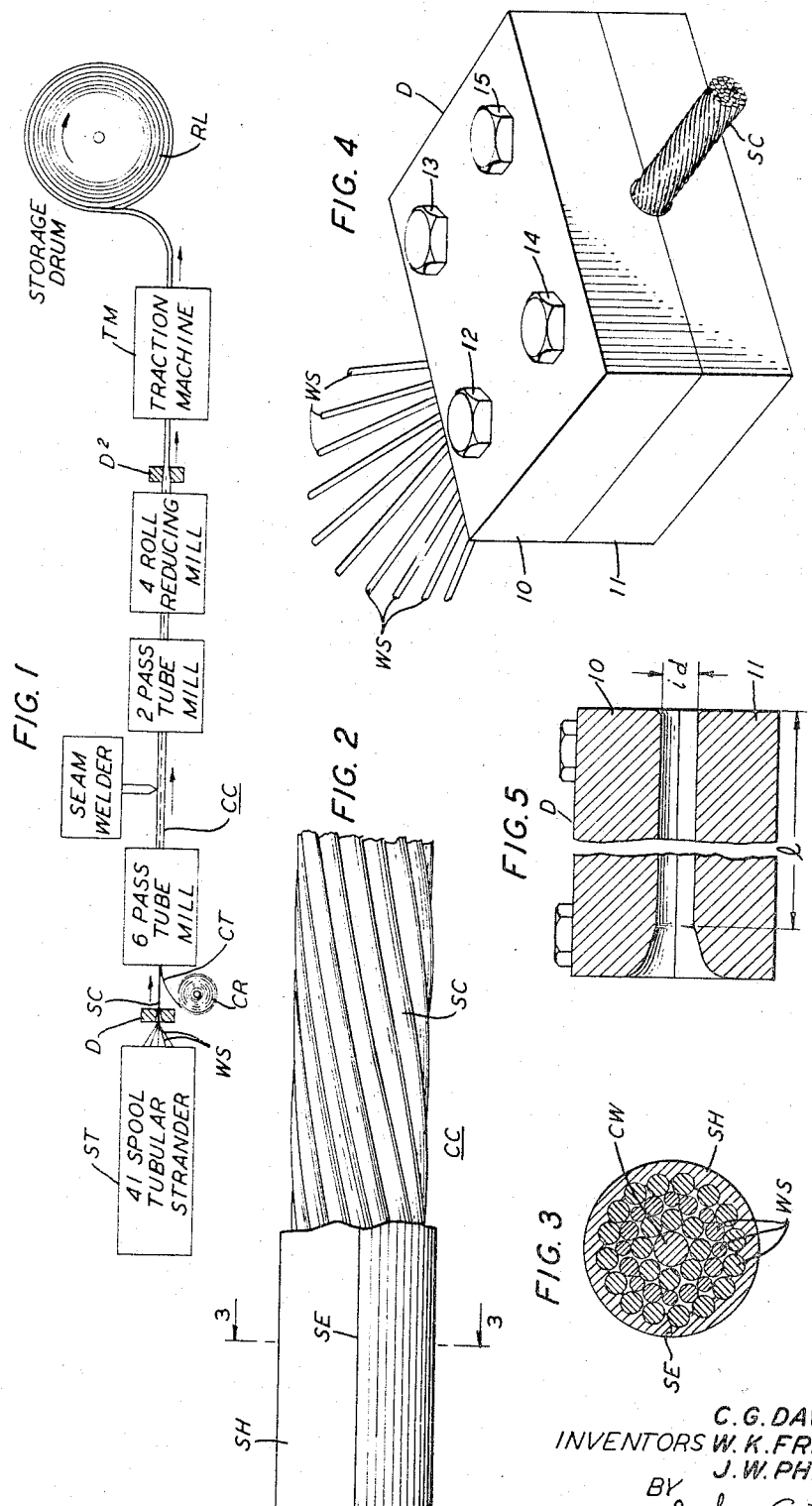
INVENTORS
C. G. DAVIS
W. K. FREEMAN
J. W. PHELPS
BY John C. Morris
ATTORNEY

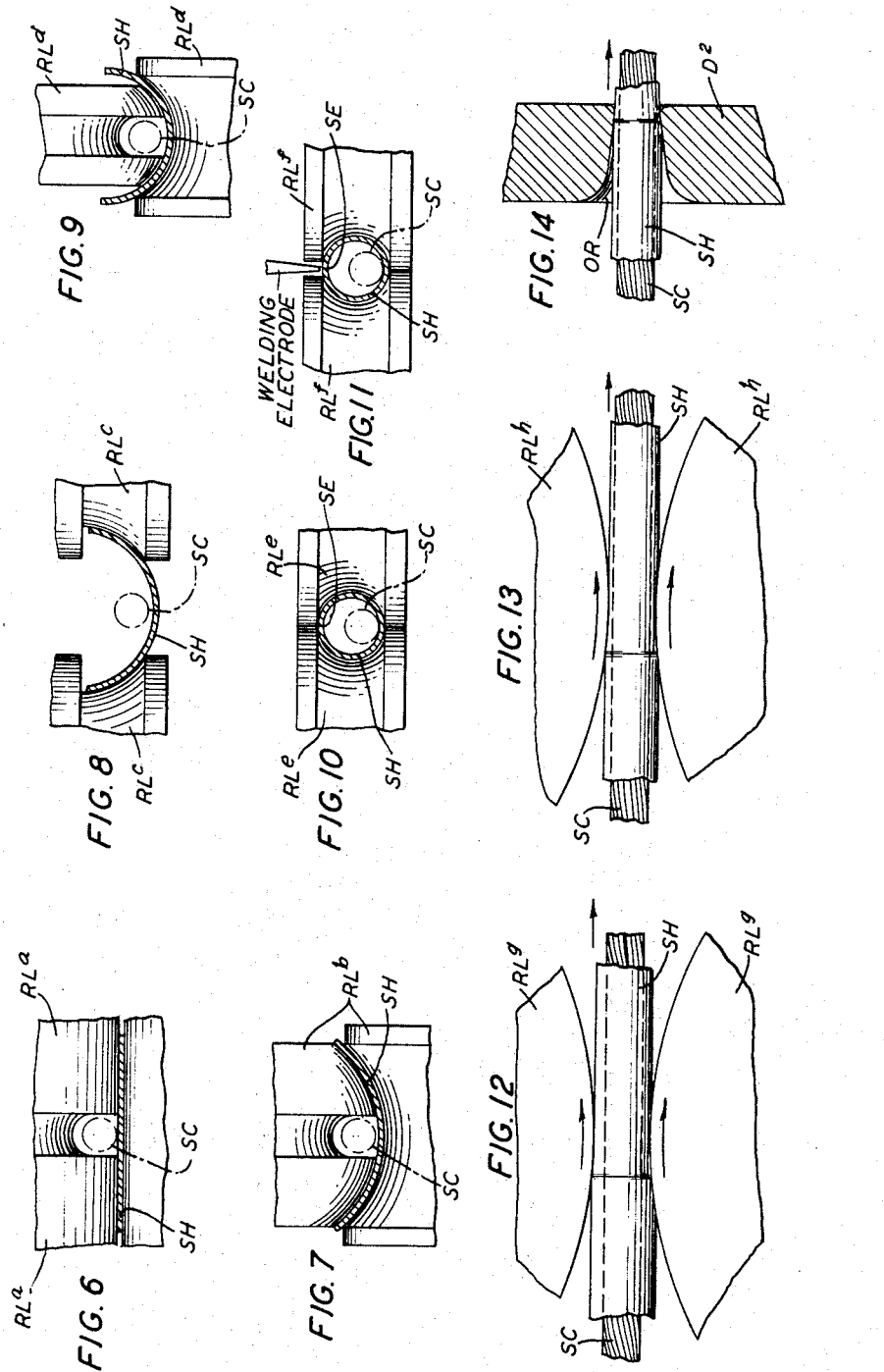

United States Patent Office 3,328,874
Patented July 4, 1967

3,328,874
**METHOD AND APPARATUS FOR MANUFAC-
TURING COMPOSITE CONDUCTORS**
Claude G. Davis, Morris Township, Morris County,
Walter K. Freeman, Wakefield, and James W. Phelps,
Middletown, N.J.; said Davis and said Phelps assignors
to Bell Telephone Laboratories, Incorporated, New
York, N.Y., a corporation of New York, and said Freeman assignor to Simplex Wire and Cable Company,
Cambridge, Mass., a corporation of Massachusetts
Filed Oct. 19, 1962, Ser. No. 231,720
4 Claims. (Cl. 29—470.5)

This invention relates to a method and means for eliminating or reducing the working or milking back of incremental differences in the lengths of the individual wires that make up a stranded center core member.

For example, the problems encountered in underwater cable installations are unique and necessitate cable having outstanding mechanical and electrical properties. The center conductor, subject to the disclosed manufacturing process, is comprised of a series of individual, extremely hard, high tensile strength wires. The wires are stranded together in a wire rope-type center strength member, over which a cover or envelope of electrically conducting material is formed and mechanically bonded. It is necessary to use special high tensile strength wires in the strength member because extremely high stress levels can be reached in laying or retrieving cable in deep water. To illustrate, the stresses resisted by the cable are comprised of a static and a dynamic component. The static component is made up of the weight of the unsupported length of the cable being laid or retrieved, which can be considerable in deep water, while the dynamic component includes the cable's natural resistance to moving through the water and that stress induced by the rolling of a cable laying ship in active or rough waters.

A number of processes and structures for producing similar composite conductors are disclosed in the prior art. However, they have certain disadvantages which restrict their incorporation in the manufacture of extremely long single lengths of ocean cable requiring the physical properties mentioned above. A patent issued to G. S. Knapp on Oct. 17, 1871 and bearing the number 119,987 disloses a method for twisting wires into a center core member, passing the core between rollers for straightening and then impressing a copper sheet around the core to form a smooth outside sheath. In addition, the formation of a smooth sheath from a heated tape or series of heated tapes around a stranded center strength member by a reducing die similar to that described herein is set forth in Swiss Patent 137,860, issued on Apr. 16, 1930. Nevertheless, these patents set forth the use of the dies in separate operations, not in a definite relationship to each other in a continuous tandem operation; nor do they suggest a solution to the problems encountered in the manufacture of extremely long lengths of ocean cable.

The prior art processes are sufficient for manufacturing products ranging in length from a few feet to thousands of feet, similar to the center conductor previously described. They are further applicable in longer operations wherein the conducting or covering material can be softened, such as by heating, to ease the mechanical forcing of the conducting material into the interstitial spaces of the stranded center member. However, when long lengths of cable must be covered with unsoftened material, basketing occurs due to the working or milking action of the final reducing die on the outer covering. Basketing is the name given to the situation wherein the incremental differences in the lengths of the individual wires are worked or milked back until they flare out somewhat in the shape of a wire basket. The basketed area ruins the continuity of the cable, necessitating either the scrapping of the cable or an expensive splice.

In making ocean cable, the outer covering of electrically conducting material cannot be heated to soften the material and thereby ease the final reducing operation because the heat will anneal the wires of the inner strength member, resulting in a net loss of tensile strength. Since a loss of tensile strength in the range of 1 percent is significant, the electrically conducting material must be forced into the center strength member interstices in a cold state, thereby necessitating an extreme amount of working or milking action by the final reducing die. Ocean cables are manufactured in lengths of at least 20 miles and any incremental differences in the wires of the center wire rope member will be milked back until they flare or basket out. It is to be noted that the length of the cable translates into manufacturing time and manufacturing time translates into a greater possibility of manufacturing error. In order to insure 20-mile lengths of cable having long life, maximum quality, and strength integrity, each length must be made in one continuous operation without stopping and without splicing anywhere in the 20-mile length.

In view of the foregoing, objects of this invention are to obtain greater efficiency in the manufacture of ocean cable by overcoming problems encountered when incremental differences in the lengths of the wires making up a stranded member are worked or milked back.

The present invention discloses a method comprising the stranding of high tensile strength wires into a wire rope-like center core member, passing the center member through a special forming die, the purpose of which will be subsequently explained, forming an electrically conducting tape around the strength member, welding the tape into a tube and then, in a series of rolling operations, reducing the tube size until the electrically conducting material is forced into the interstices of the wire cable, forming a tight mechanical bond between the conducting material and the center strength member. The last operation is completed when the center conductor is pulled through a final reducing die which draws and forces the conducting material into the interstices of the wire rope strength member.

The basketing problem previously referred to is prevented by the use of the special closing die on the strander and its relationship with the final reducing die in tandem.

Numerous advantages over the prior art are obtained by the incorporation of this invention in the manufacture of continuous lengths of composite structures. One advantage is that extremely long lengths of cable can be made in one continuous operation without encountering a flare-out or basketing of the wires making up the stranded center strength member. The cables are produced with a maximum of continuity uninterrupted by splices or odd lengths of cable ruined by such a basketing problem. Another advantage of the invention is that no lubrication is used in conjunction with the strander closing die, thereby giving a cleaner stranded core member which allows a larger selection of subsequent tube welding processes.

A feature of the invention is the inclusion in a tandem series of manufacturing processes of a unique strander closing die that cooperates in a definite relationship with a subsequent reducing die.

Other objects and features of the invention will be apparent and more clearly understood from the following detailed description, when read with reference to the following drawing, in which:

FIG. 1 is a schematic diagram, illustrating by means of labeled boxes, the steps in the forming of a composite conductor in accordance with the invention from the raw materials which make up the conductor to the finished product;

FIG. 2 is a fragmentary view of the conductor of the invention with the sheath broken away to show the stranded core;

FIG. 3 is a cross-sectional view taken at line 3—3 of FIG. 2;

FIG. 4 is a view in perspective of the closing die for forming the core member showing the individual strands being fed into one side of it and the resulting twisted core member emerging from another side;

FIG. 5 is a cross-sectional view of the closing die shown in FIG. 4 illustrating the shape and length of the throat thereof;

FIGS. 6 through 10 illustrate the forming of the metallic sheath about the core member and, in particular;

FIG. 6 shows the core member and the metallic sheath passing through the first pass rolls of the six-pass tube mill;

FIGS. 7, 8 and 9 illustrate various stages in the forming of the sheath as it passes through the rolls in the six-pass tube mill;

FIG. 10 shows the last stage in the forming of the sheath in the six-pass tube mill prior to the welding of the seam;

FIG. 11 is a view similar to FIG. 10 but shows the welding electrode in position over the seam of the sheath;

FIGS. 12 and 13 illustrate the first and fourth rolls in the four-roll reducing mill, the intervening rolls not being shown for the sake of clarity and to avoid undue repetition; and FIG. 14 is a final reducing die which reduces the sheath to the proper size, forces it into intimate contact with the stranded core, and into the interstices thereof.

In accordance with the preferred embodiment of the invention and FIG. 1, the stranded core SC is manufactured from a standard 41 spool tubular strander ST that has been fitted with a special closing or forming die D. The method contemplates the use of wires WS with dissimilar outer diameters and, in fact, incorporates a center wire CW of larger outer diameter than the smaller wires WS wound around it. The stranded core SC is made from a series of very hard, high tensile strength wires WS that are twisted together by the stranding machine ST and then formed into an extremely tight center wire core member SC by the special die D which is shown in perspective in FIG. 4. The uniqueness of the die D will be explained in a later portion of this specification.

After the stranded core SC passes through the closing die D, a metallic tape CT, copper in this instance, is fed from a storage roll CR into a six-pass tube mill along with the center strength member SC, but at a different speed. The tube mill forms the tape CT into a tube-like sheath SH around the core SC. FIGS. 6 through 10 illustrate one contemplated rolling process wherein the rollers shown in the various figures (designated $RL^a$, $RL^b$, $RL^c$, $RL^d$ and $RL^e$) form the tape CT around the core SC into a tube having a longitudinal seam SE formed from the abutting edges of the copper tape CT when it is rolled into the sheath SH.

FIG. 11 illustrates one method of welding the two edges of the copper tape CT into a continuous tube or sheath SH. Particular attention and care must be taken in the welding operation to prevent the welding heat from being conducted to the stranded core SC and annealing the wires WS that make up the core SC. The use of chill blocks is one contemplated means for preventing the transfer of the welding heat to the core SC.

After welding, the composite conductor CC that emerges from the tube mill and welding area passes through a series of reducing mills. The outer sheath SH is reduced in size by a series of rollers, two of which have been illustrtaed in FIGS. 12 and 13. The rollers, which are identified as $RL^g$ and $RL^h$, decrease the sheath SH diameter until it nearly coincides with the outside diameter of the center strength core member SC.

FIGURE 14 shows the final reducing die $D^2$, in which an orifice OR has been made of such a diameter that it forces the sheath SH into intimate contact with the standard core member SC so that the sheath SH is mechanically bonded to the core SC by being forced or deformed into the interstitial spaces between the wires WS of the core SC. FIG. 3 illustrates the deformed sheath SH, showing a smooth outer diameter or surface and the cold working or flowing of the sheath SH into the interstices of the stranded core SC. Because the reducing mill performs its operations by drawing or working the outer sheath SH down to the dimensions of the core SC, the sheath SH and core SC travel at different speeds throughout the entire process, until they are mechanically joined into a unitary structure at the final reducing die $D^2$.

After passing through the final reducing die $D^2$, the finished product is rolled onto a storage drum RL awaiting further processing. Power is supplied to the entire manufacturing process by a traction machine TM, the endless belt type being preferred, interspersed between the final reducing die $D^2$ and the storage drum RL.

The basketing problem previously described is caused by the working or milking back of incremental differences in the wires WS of the center member SC by the final reducing die $D^2$. Since the die $D^2$ must have an orifice OR small enough to force the sheath material SH into the interstitial spaces of the core SC (as shown in FIG. 3), any difference in wire length of one wire with its neighbors will be worked or milked back inside the tube. Because the composite member is manufactured in extreme lengths, 20 miles or better, the incremental lengths are given sufficient time to add up over the manufacturing process until a susbtantial dissimilarity in length exists among the wires WS, making up the core SC. When this happens, the longer wires flare out in a shape similar to a basket, ruining the continuity of the cable.

The problem of basketing was solved by the closing die D and its novel interrelationship with the reducing die $D^2$ in the subject method. The die D is shown in perspective in FIG. 4 and in section in FIG. 5. FIG. 4 illustrates the individual wires WS entering in one side of the die D and exiting through the other side as a stranded core member SC.

The die D, as illustrated, is made of two halves 10 and 11 that are bolted together by the bolts 12, 13, 14 and 15. By tradition, most closing dies have a throat inside diameter equal to or a little larger than the cable outside diameter being manufactured and the throat is usually in the neighborhood of one-half the throat diameter in length. The die D of the subject process has a throat inside diameter $id$ less than the outside diameter of the stranded core SC and its length $l$ is many times the throat diameter $id$ of the die D. The die D is operated in a nonlubricated state to increase the frictional forces between the die D and the core SC. The die D is designed to work or milk the wires WS of the core SC and to do at least as much and theoretically more working or milking of the individual wires WS of the core SC than does the final reducing die $D^2$. The amount of working or milking of the first die D is determined by the amount of the second $D^2$; that of die D being equal to or greater than that of die $D^2$.

When the amount of milking has been set in accordance with the relationship set forth above, this method is capable of producing extremely long lengths of cable without interruption of the manufacturing process. Twenty-mile lengths of cable may be made in one continuous process without interruptions in the continuity of the cable.

This method may be employed and modified by those skilled in the art in ways too numerous to mention; some of the more obvious being the addition of measuring devices, alternate welding or forming operations, alternate die designs, etc., without departing from the spirit of the invention and the scope of the appended claims.

What is claimed is:

1. A method of forming a composite conductor comprising the ordered steps of grouping together a plurality of wires into a strand having substantially a uniform diameter, applying said strand through a die having a throat diameter smaller than the diameter of said strand and throat walls working and milking back incremental differences in the lengths of said strand wires, advancing a tape adjacent said strand at a slower speed than the application speed of said strand to said die, folding said tape loosely over said strand to form a sheath, securing abutting edges of said tape to form a seal, and applying said sheath strand through another die having throat walls working said sheath into the interstices of said strand.

2. A method of forming a composite conductor comprising the ordered steps of stranding together a plurality of dissimilar diameter wires into a member having substantially a uniform diameter, applying said member through a die having a throat diameter smaller than the diameter of said member and throat walls working and milking back incremental differences in the lengths of said member wires, advancing a metallic tape adjacent said member at a slower speed than the application speed of said member to said die, folding said tape loosely over said member to form a sheath, welding abutting edges of said tape to form a hermetic sealed tube coaxial with said member, and applying said tube member through another die having throat walls working said tube into the interstices of said member, and milking back said member wires a degree less than said milking back by said first-mentioned die.

3. Apparatus for forming a composite structure from a plurality of wires and a tape comprising stranding means having a die with a throat therein, said throat having side walls that are adapted to group said wires into a member of substantially a uniform diameter, said throat further having a diameter less than said member diameter, tape dispensing means being adapted to feed tape for covering said member, forming means including a series of roller dies that are adapted to form said tape in a sheath around said member, securing means adapted to secure abutting edges of said tape in a coaxial tube with said member, and reducing means having a final die with a throat therein, said throat of said final die having side walls that are adapted to work the tube into intimate contact with said member, said tube being deformed by said walls into the interstitial spaces of said member, the side walls of said final die throat designed in relationship to said walls of said first-mentioned die throat to work the incremental length differences in said member wires a degree less than the working of said wires by said first-mentioned throat walls.

4. A method of forming a composite conductor comprising the ordered steps of grouping together a plurality of wires into a strand having substantially a uniform diameter, applying said strand through a die having a throat diameter smaller than the diameter of said strand and throat walls working and milking back incremental differences in the lengths of said strand wires, advancing a tape adjacent said strand at a slower speed than the application speed of said strand to said die, folding said tape loosely over said strand to form a sheath, securing abutting edges of said tape to form a seal, and applying said sheath strand through another die having throat walls working said sheath into the interstices of said strand and milking back said strand wires a degree less than said milking back by said first-mentioned die.

References Cited

UNITED STATES PATENTS

| 119,987 | 10/1871 | Knapp | 205—17 |
| 280,764 | 7/1883 | Rafer et al. | 205—17 |
| 2,063,470 | 12/1936 | Staples | 29—474.1 |
| 2,088,446 | 7/1937 | Specht | 29—474.1 |
| 2,156,952 | 5/1939 | Morsing | 29—505 |
| 3,154,846 | 11/1964 | Alexander | 29—474.1 X |

FOREIGN PATENTS

| 137,860 | 4/1930 | Switzerland. |

CHARLIE T. MOON, *Primary Examiner.*

WHITMORE A. WILTZ, *Examiner.*